(12) United States Patent
Suh et al.

(10) Patent No.: US 9,596,413 B2
(45) Date of Patent: Mar. 14, 2017

(54) DISPLAY APPARATUS FOR CONTROLLING FIELD OF VIEW

(71) Applicant: Samsung Electronics Co., Ltd., Suwon-si (KR)

(72) Inventors: Sung Joo Suh, Seoul (KR); Kwon Ju Yi, Yongin-si (KR); Chang Kyu Choi, Seongnam-si (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 13/736,495

(22) Filed: Jan. 8, 2013

(65) Prior Publication Data

US 2013/0250064 A1    Sep. 26, 2013

(30) Foreign Application Priority Data

Mar. 20, 2012 (KR) .................. 10-2012-0028324

(51) Int. Cl.
*H04N 5/232* (2006.01)
*H04N 5/369* (2011.01)
(Continued)

(52) U.S. Cl.
CPC ..... *H04N 5/23293* (2013.01); *H04N 5/23245* (2013.01); *H04N 5/3696* (2013.01); *H04N 13/0409* (2013.01); *H04N 13/0452* (2013.01)

(58) Field of Classification Search
CPC ........ G02B 27/26; G02B 27/22; H04N 5/232; H04N 5/23293; H04N 5/2226; H04N 1/00129; H04N 1/00127; H04N 5/225; H04N 13/0452; H04N 5/3696; H04N 5/23245; H04N 13/0409; H04N 5/222; H04N 1/04; H04N 9/31; G06F 3/0325; G06F 3/0425; G09G 2360/141; G09G 2360/144; G09G 3/3426; G09G 3/32; G09G 2330/08;

(Continued)

(56) References Cited

U.S. PATENT DOCUMENTS 5,448,053 A * 9/1995 Rhoads .................. G02B 26/06
                                                    250/201.9
7,525,615 B2 * 4/2009 Zhang ................ H04N 1/02805
                                                    250/208.1
(Continued)

FOREIGN PATENT DOCUMENTS

JP        2004-054273        2/2004
KR    10-2001-0103100      11/2001
(Continued)

OTHER PUBLICATIONS

"Lenses Imaging With Controllable Aperture" by, Assaf Zomet et al., (hereinafter Zomet) 2006 IEEE 0-7695-2597-0/06.*

*Primary Examiner* — Chikaodili E Anyikire
*Assistant Examiner* — Dramos I Kalapodas
(74) *Attorney, Agent, or Firm* — NSIP Law

(57) ABSTRACT

A display apparatus for controlling a field of view is provided. When a mode it set to a photograph mode, the display apparatus may control the field of view when photographing, by sensing an input light emitted from an object and transmitted through a first panel on which a field of view control pattern is formed, and a second panel on which an imaging pattern is formed.

18 Claims, 7 Drawing Sheets

(51) Int. Cl.
*H04N 13/04* (2006.01)
*H04N 1/04* (2006.01)
*H04N 5/222* (2006.01)
*G09G 3/36* (2006.01)

(58) Field of Classification Search
CPC .......... G09G 3/006; G09G 2320/0626; G09G 2300/0426; G09G 3/2088; G09G 3/3216; G09G 3/36; G02F 2001/13629; G02F 1/133345; G02F 2001/13312; G02F 1/13; H01L 27/14; G01B 11/24
See application file for complete search history.

(56) References Cited

U.S. PATENT DOCUMENTS

| | | | | |
|---|---|---|---|---|
| 2006/0157640 | A1* | 7/2006 | Perlman | H04N 5/2254 250/208.1 |
| 2007/0081200 | A1* | 4/2007 | Zomet | H04N 1/04 358/484 |
| 2008/0106629 | A1* | 5/2008 | Kurtz | H04N 7/144 348/333.01 |
| 2008/0165267 | A1* | 7/2008 | Cok | H04N 7/144 348/333.01 |
| 2008/0309754 | A1* | 12/2008 | Nayar | H04N 13/0242 348/46 |
| 2010/0182688 | A1* | 7/2010 | Kim et al. | 359/465 |
| 2011/0019056 | A1* | 1/2011 | Hirsch | G06F 3/0325 348/333.01 |
| 2011/0141560 | A1* | 6/2011 | Kim et al. | 359/463 |
| 2011/0285861 | A1* | 11/2011 | Maglaque | 348/207.1 |
| 2012/0007898 | A1* | 1/2012 | Pavicic | G09G 3/2088 345/690 |
| 2012/0127128 | A1* | 5/2012 | Large | G06F 3/0425 345/175 |
| 2012/0200680 | A1* | 8/2012 | So et al. | 348/54 |

FOREIGN PATENT DOCUMENTS

| | | |
|---|---|---|
| KR | 10-2004-0026237 | 3/2004 |
| KR | 10-2005-0016952 | 2/2005 |
| KR | 10-2005-0056068 | 6/2005 |
| KR | 10-2006-0078165 | 7/2006 |
| KR | 10-2006-0096844 | 9/2006 |
| KR | 10-2010-0039618 | 4/2010 |
| KR | 10-2010-0085753 | 7/2010 |

* cited by examiner

DISPLAY APPARATUS FOR CONTROLLING FIELD OF VIEW

CROSS-REFERENCE TO RELATED APPLICATIONS

This application claims the priority benefit of Korean Patent Application No. 10-2012-0028324, filed on Mar. 20, 2012, in the Korean Intellectual Property Office, the disclosure of which is incorporated herein by reference.

BACKGROUND

1. Field

Embodiments relate to a display apparatus for controlling a field of view when photographing, by disposing, on an upper portion of a second panel on which an imaging pattern is formed, a first panel on which a field of view control pattern is formed, and sensing an input light emitted from an object and transmitted through the first panel and the second panel.

2. Description of the Related Art

A display apparatus may acquire a plurality of images of an object, by sensing an input light emitted from the object and transmitted through an image panel on which a plurality of imaging patterns is formed.

FIG. 1 illustrates an image acquired by a display apparatus 101 according to a conventional art.

Referring to FIG. 1, the display apparatus 101 may sense an input light emitted from an object 107 and transmitted through a panel 103 on which an imaging pattern is formed. The display apparatus 101 may sense, using a sensor panel 105, m input lights passing through m imaging patterns formed on the panel 103, and may acquire an image of the object 107 using the m input lights sensed. Here, m denotes a natural number.

In this instance, the display apparatus 101 may acquire a first entire image 109 of the object 107, using a first input light sensed by the sensor panel 105, that is, an input light passing through a first imaging pattern, and may acquire a second entire image 111 of the object 107, using a second input light sensed by the sensor panel 105, that is, an input light passing through a second imaging pattern. Accordingly, the display apparatus 101 may need to maintain a predetermined distance between the plurality of imaging patterns on the panel 103 that is disposed at a position corresponding to a position of the sensor panel 105, so that the entire image of the object 107 may be acquired using each input light sensed by the sensor panel 105.

Since a number of imaging patterns to be formed on a panel of a limited size may be limited, a number of images acquired by the display apparatus 101 may be limited. Accordingly, as a number of acquired images increases, a spatial resolution of an image may be reduced.

SUMMARY

In an aspect of one or more embodiments, there is provided a display apparatus for controlling a field of view, the display apparatus including a mode determining unit to determine a mode based on a set condition, and a sensor panel to sense an input light emitted from an object and transmitted through a first panel and a second panel when the mode is set to a photograph mode by the mode determining unit.

Positions of n first patterns on the first panel may correspond to positions of n second patterns on the second panel, respectively. Here, n denotes a natural number.

The display apparatus may further include a processor to acquire n partial images of the object using sensed n input lights, and to configure the entire image of the object, based the acquired n partial images, when the sensor panel senses the n input lights passing through the first pattern and the second pattern.

The first panel may form a first pattern when the mode is set to the photograph mode, and the first panel may adjust a size of an aperture in the first pattern, in relation to adjustment of a field of view with respect to the input light to be transferred to the second panel.

The second panel may form a second pattern when the mode is set to the photograph mode, and the second panel may transfer, through an aperture in the second pattern to the sensor panel, the input light passing through the adjusted aperture in the first pattern.

The display apparatus may further include a control unit to control a backlight unit to be turned ON to radiate a backlight to the second panel, and to control a barrier pattern to be formed on the first panel to visualize an image to be displayed on the second panel as a three-dimensional (3D) image, when the mode is set to a display mode by the mode determining unit.

The display apparatus may further include a control unit to control a backlight unit to be turned ON to radiate a backlight through the second panel to the first panel, and to control a barrier pattern to be formed on the second panel to visualize an image to be displayed on the first panel as a 3D image, when the mode is set to a display mode by the mode determining unit.

Each of the first panel and the second panel may include a first pixel which is opaque and a second pixel which is transparent. The first panel may form at least one pattern of a circular hole pattern, and a polygonal hole pattern, by combining the first pixel and the second pixel, and the second panel may form at least one pattern of a circular hole pattern, a polygonal hole pattern, and a Modified Uniformly Redundant Array (MURA) pattern, by combining the first pixel and the second pixel.

A predetermined distance between the first panel and the second panel may be maintained.

In an aspect of one or more embodiments, there is provided a display apparatus for controlling a field of view, the display apparatus including a backlight unit to irradiate backlight; a mode determiner to determine a mode based on a set condition; and a sensor panel to sense at least one input light that is emitted from an object and transmitted through a first panel and a second panel when the mode is set to a photograph mode by the mode determiner, and the sensor panel to transmit backlight irradiated from the backlight unit to the second panel using at least one aperture in the sensor panel when the mode is set to a display mode by the mode determiner.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
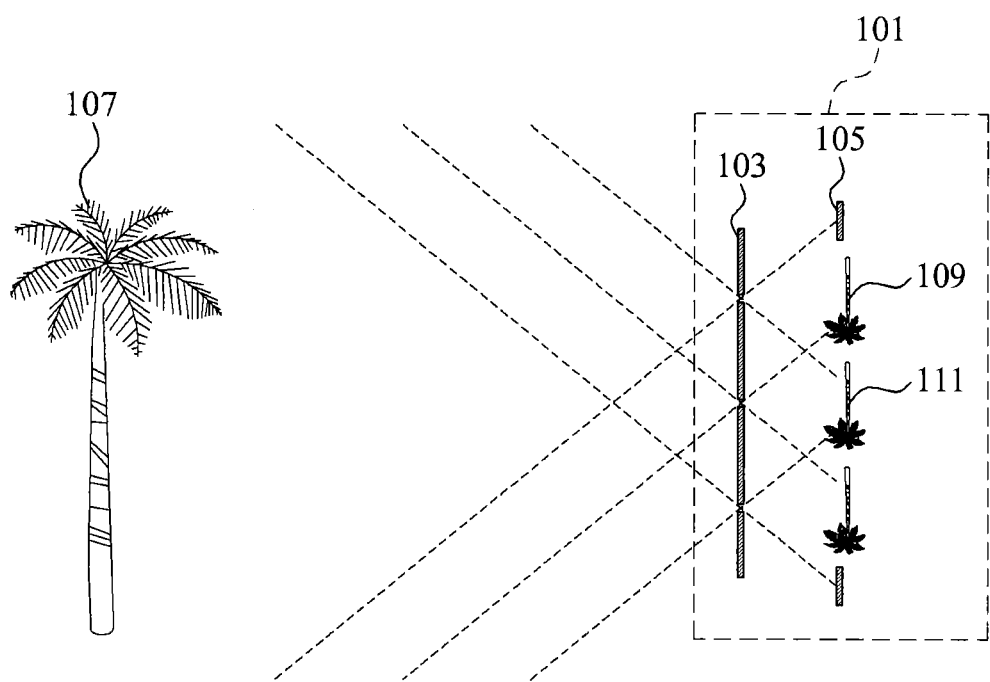
FIG. 1 illustrates an image acquired by a display apparatus according to a conventional art.

Reference will now be made in detail to embodiments, examples of which are illustrated in the accompanying drawings, wherein like reference numerals refer to the like elements throughout. Embodiments are described below to explain the present disclosure by referring to the figures.

Figure 2:
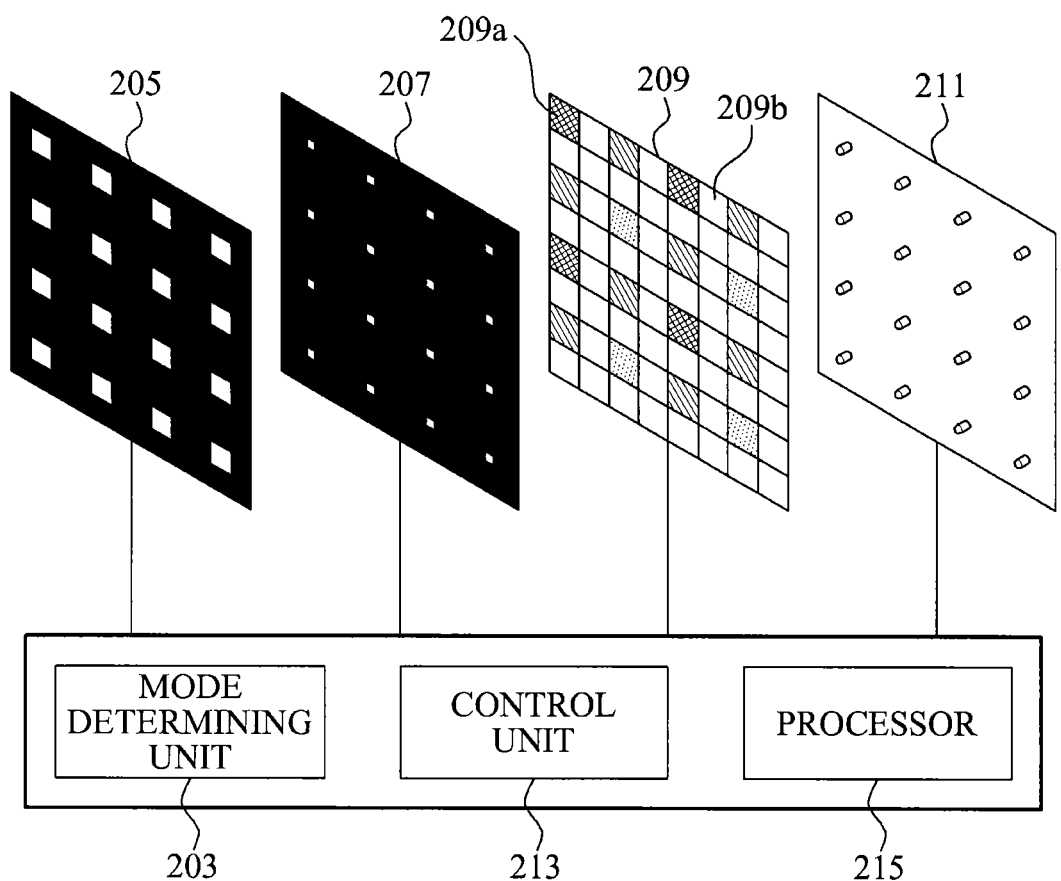
FIG. 2 illustrates a display apparatus for controlling a field of view in a photograph mode according to an embodiment.
Figure 3:
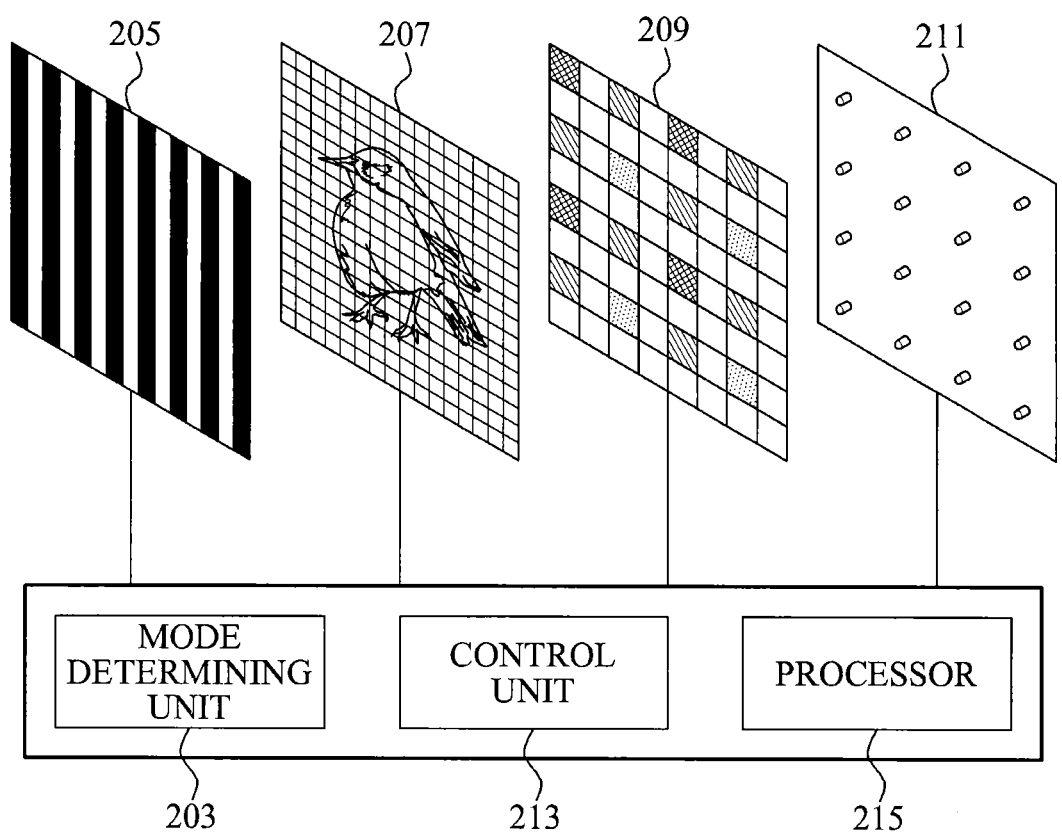
FIG. 3 illustrates a display apparatus for controlling a field of view in a display mode according to an embodiment.

FIGS. 2 and 3 illustrate a configuration of a display apparatus 201 for controlling a field of view according to embodiments. Here, FIG. 2 illustrates the display apparatus 201 for controlling a field of view in a photograph mode, and FIG. 3 illustrates the display apparatus 201 for controlling a field of view in a display mode.

Referring to FIG. 2, the display apparatus 201 may include a mode determining unit (mode determiner) 203, a first panel 205, a second panel 207, a sensor panel 209, a backlight unit 211, a control unit (controller) 213, and a processor 215.

The mode determining unit 203 may determine a mode based on a set condition, for example, a display mode or a photograph mode. In this instance, the mode determining unit 203 may set, as the condition, at least one of an occurrence of a mode change command, and an advent of mode change period. For example, when the display apparatus 201 is operated at a frequency of 240 hertz (Hz), the mode determining unit 203 may change the mode alternatively to the display mode at 120 Hz, and to the photograph mode at 120 Hz.

The first panel 205 may correspond to, for example, a barrier panel, and may be disposed on an upper portion of the second panel 207. The first panel 205 may form a pattern based on a mode determined by the mode determining unit 203. In particular, when the mode is set to the photograph mode by the mode determining unit 203, the first panel 205 may form a first pattern, for example, a field of view control pattern, to transmit an input light emitted from an object. In this instance, the first panel 205 may include a first pixel that is opaque, and a second pixel that is transparent, and may form, as the first pattern, at least one pattern of a circular hole pattern, and a polygonal hole pattern, by combining the first pixel and the second pixel.

Here, the first panel 205 may form n first patterns, and may transmit n input lights emitted from the object and transmitted through n apertures corresponding to the circular hole pattern, the polygonal hole pattern, or a Modified Uniformly Redundant Array (MURA) pattern. Here, n denotes a natural number. In this instance, the first panel 205 may form the n first patterns at positions corresponding to positions of n second patterns to be formed on the second panel 207, respectively. The first panel 205 may form a first pattern having a shape identical to or different from a shape of a second pattern. For example, when the second pattern is formed to include the circular hole pattern, the first panel 205 may form the first pattern to include the circular hole pattern, or the polygonal hole pattern.

Also, the first panel 205 may adjust a size of an aperture in the first pattern, in relation to adjusting of a field of view with respect to an input light transferred to the second panel 207, that is, an angle at which the input light enters the second panel 207. In this instance, although the first panel 205 may adjust the size of the aperture in the first pattern to be greater than a size of an aperture in the second pattern of the second panel 207, the size of the aperture in the first pattern may not be limited thereto.

The first panel 205 may maintain a distance from the second panel 207, and may adjust the size of the aperture in the first pattern based on the distance of a desired field of view θ.

Here, the field of view θ may be expressed by Equation 1.

$$\theta = 2\arctan\left(\frac{b}{g}\right) \quad \text{[Equation 1]}$$

In Equation 1, b denotes a size of an aperture in the first pattern, and g denotes a distance between the first panel 205 and the second panel 207.

When the mode is set to the display mode by the mode determining unit 203, the first panel 205 may form a barrier pattern to visualize an image to be displayed on the second panel 207 as a three-dimensional (3D) image, as shown in FIG. 3, so that different images may be recognized based on a disparity between left and right views. Here, the first panel 205 may form, for example, a striped pattern, as the barrier pattern.

The second panel 207 may correspond to an image panel, for example, a liquid crystal display (LCD) panel, and may be disposed on a lower portion of the first panel 205. When the mode is set to the photograph mode by the mode determining unit 203, the second panel 207 may form a second pattern, for example, an imaging pattern, to transmit an input light emitted from the object and transmitted through the first panel 205. In this instance, the second panel 207 may include a first pixel that is opaque, and a second pixel that is transparent, and may form, as the second pattern, at least one pattern of a circular hole pattern, a polygonal hole pattern, and a Modified Uniformly Redundant Array (MURA) pattern, by combining the first pixel and the second pixel.

Here, the second panel 207 may form n second patterns, and may transmit, through n apertures corresponding to the circular hole pattern, the polygonal hole pattern, or the MURA pattern, n input lights emitted from the object and transmitted through the n apertures in the first panel 205. That is, the second panel 207 may transfer, through the apertures in the second pattern to the sensor panel 209, the input lights passing through the apertures in the first pattern of the first panel 205.

When the mode is set to the display mode by the mode determining unit 203, the second panel 207 may display an image, using a backlight radiated from the backlight unit 211, as shown in FIG. 3. In this instance, the second panel 207 may display a 3D image including a left image and a right image.

When the mode is set to the photograph mode by the mode determining unit 203, the sensor panel 209 may sense an input light emitted from the object and transmitted through the first panel 205 and the second panel 207. That is, the sensor panel 209 may sense n input lights passing through the n first patterns on the first panel 205, and the n second patterns on the second panel 207, respectively.

In particular, the sensor panel 209 may include a sensor unit 209*a* to sense an input light, and an aperture 209*b* to transmit a light, in a checkered pattern or in a repetitive pattern. That is, when the mode is set to the photograph mode by the mode determining unit 203, the sensor panel 209 may sense, using the sensor unit 209*a*, input lights emitted from the object and transmitted sequentially through apertures in the first pattern of the first panel 205 and apertures in the second pattern of the second panel 207. Conversely, when the mode is set to the display mode by the mode determining unit 203, the sensor panel 209 may transmit, to the second panel 207, the backlight radiated from the backlight unit 211, using the aperture 209*b*.

Here, although the sensor panel 209 may be configured to be separately disposed on a lower portion of the second panel 207, the configuration of the sensor panel 209 may not be limited thereto. The sensor panel 209 may be configured integrally to be included in the second panel 207. When the sensor panel 209 is configured integrally, the sensor panel 209 may include only the sensor unit 209*a*.

The backlight unit 211 may be turned ON to radiate a backlight, or may be turned OFF to limit radiation of the backlight, based on the control of the control unit 213. Although the backlight unit 211 may be disposed on a lower portion of the sensor panel 209, the position of the backlight unit 211 may not be limited thereto. The backlight unit 211 may be disposed in the aperture 209*b* in the sensor panel 209.

The control unit 213 may control power supplied to the backlight unit 211 associated with the second panel 207, based on the mode determined by the mode determined unit 203. For example, when the mode is set to the photograph mode by the mode determining unit 203, the control unit 213 may control the backlight unit 211 to be turned OFF to limit the radiation of the backlight.

Conversely, when the mode is set to the display mode by the mode determining unit 203, the control unit 213 may control the backlight unit 211 to be turned ON to radiate the backlight through the aperture 209*b* in the sensor panel 209 to the second panel 207, such that an image may be displayed on the second panel 207 using the backlight radiated from the backlight unit 211. In this instance, when the mode is set to the display mode by the mode determining unit 203, the control unit 213 may form a barrier pattern on the first panel 205 to visualize the image to be displayed on the second panel 207 as a 3D image.

The processor 215 may acquire the image of the object, using the input light sensed by the sensor panel 209. That is, the processor 215 may acquire n partial images of the object, using n input lights sensed by the sensor panel 209, and may configure the entire image of the object based on the n partial images acquired.

Figure 4:
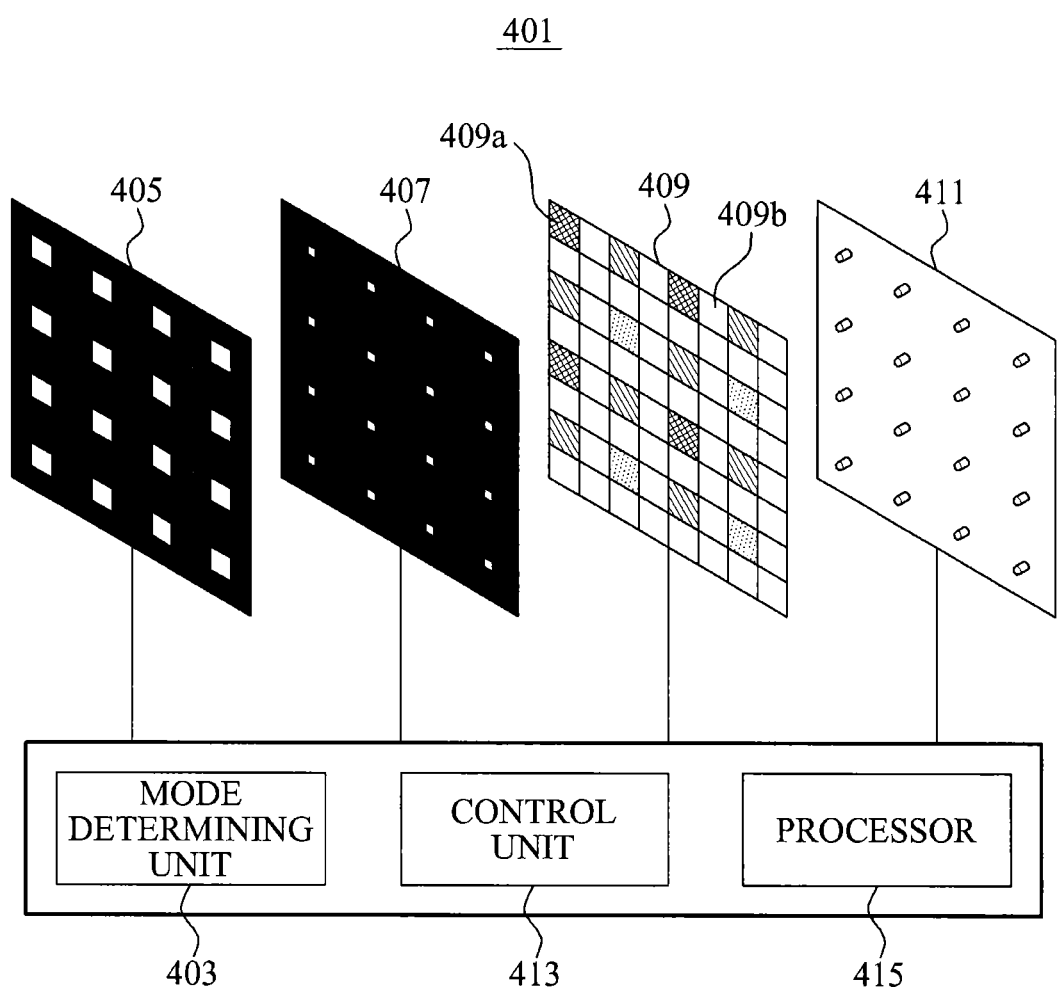
FIG. 4 illustrates a display apparatus for controlling a field of view in a photograph mode according to an embodiment.
Figure 5:
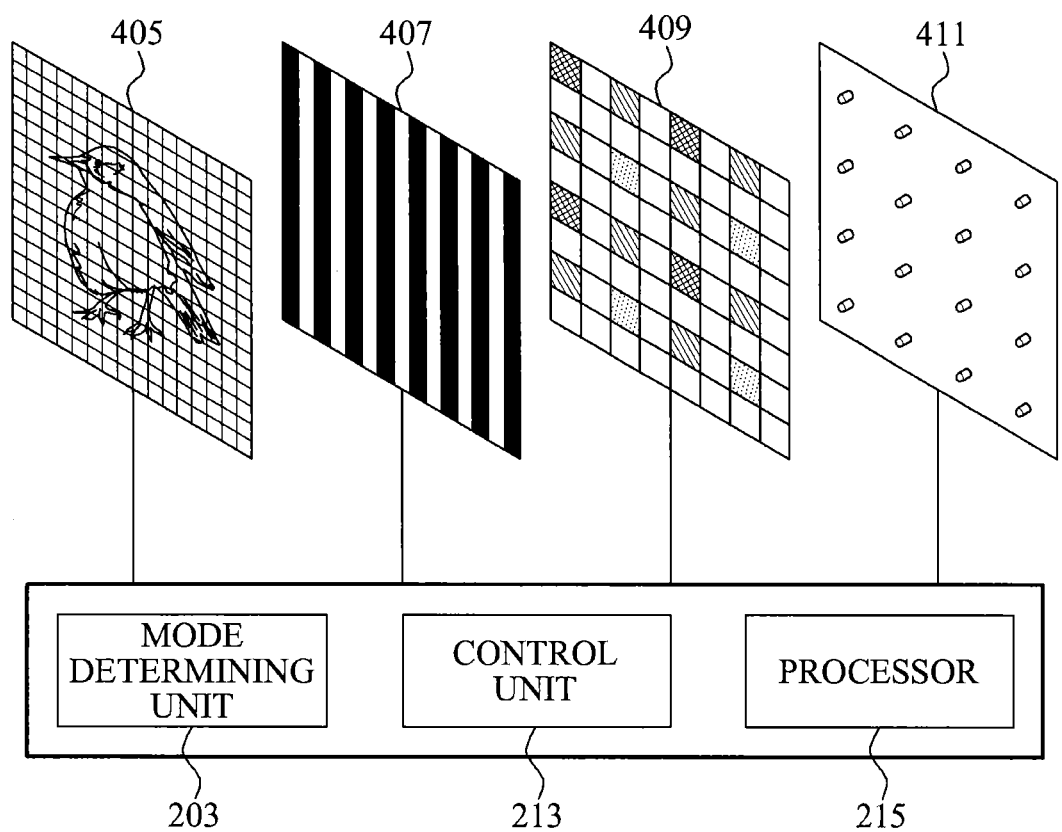
FIG. 5 illustrates a display apparatus for controlling a field of view in a display mode according to an embodiment.

FIGS. 4 and 5 illustrate a configuration of a display apparatus 401 for controlling a field of view according to embodiments. Here, FIG. 4 illustrates the display apparatus 401 for controlling a field of view in a photograph mode, and FIG. 5 illustrates the display apparatus 401 for controlling a field of view in a display mode.

Referring to FIG. 4, the display apparatus 401 may include a mode determining unit 403, a first panel 405, a second panel 407, a sensor panel 409, a backlight unit 411, a control unit 413, and a processor 415.

The mode determining unit 403 may determine a mode based on a set condition, for example, a display mode or a photograph mode. In this instance, the mode determining unit 403 may set, as the condition, at least one of an occurrence of a mode change command, and an advent of mode change period. For example, when the display apparatus 401 is operated at a frequency of 240 Hz, the mode determining unit 403 may change the mode alternatively to the display mode at 120 Hz, and to the photograph mode at 120 Hz.

The first panel 405 may correspond to, for example, an image panel, and may be disposed on an upper portion of the second panel 407. When the mode is set to the photograph mode by the mode determining unit 403, the first panel 405 may form a first pattern, for example, a field of view control pattern, to transmit an input light emitted from an object. In this instance, the first panel 405 may include a first pixel that is opaque, and a second pixel that is transparent, and may form, as the first pattern, at least one pattern of a circular hole pattern, and a polygonal hole pattern, by combining the first pixel and the second pixel.

Here, the first panel 405 may form n first patterns, and may transmit n input lights emitted from the object and transmitted through n apertures corresponding to the circular hole pattern or the polygonal hole pattern. Here, n denotes a natural number. In this instance, the first panel 405 may form the n first patterns at positions corresponding to positions of n second patterns to be formed on the second panel 407, respectively. The first panel 405 may form a first pattern having a shape identical to or different from a shape of a second pattern.

Also, the first panel 405 may adjust a size of an aperture in the first pattern, in relation to adjusting of a field of view with respect to an input light transferred to the second panel 407, that is, an angle at which the input light enters the second panel 407. For example, the first panel 405 may adjust the size of the aperture in the first pattern to be greater than a size of an aperture in the second pattern of the second panel 407.

The first panel 405 may maintain a distance from the second panel 407, and may adjust the size of the aperture in the first pattern based on the distance of a desired field of view.

When the mode is set to the display mode by the mode determining unit 403, the first panel 405 may display an image, using a backlight radiated from the backlight unit 411, as shown in FIG. 5. In this instance, the first panel 405 may display a 3D image including a left image and a right image.

The second panel 407 may correspond to, for example, a barrier panel, and may be disposed on a lower portion of the first panel 405. The second panel 407 may form a pattern based on a mode determined by the mode determining unit 403. In particular, when the mode is set to the photograph mode by the mode determining unit 403, the second panel 407 may form a second pattern to transmit an input light emitted from the object and transmitted through the first panel 405. In this instance, the second panel 407 may include a first pixel that is opaque, and a second pixel that is transparent, and may form, as the second pattern, at least one pattern of a circular hole pattern, a polygonal hole pattern, and an MURA pattern, by combining the first pixel and the second pixel.

Here, the second panel 407 may form n second patterns, and may transmit, through n apertures corresponding to the circular hole pattern, the polygonal hole pattern, or the MURA pattern, n input lights emitted from the object and transmitted through the n apertures in the first panel 405. Here, n denotes a natural number.

When the mode is set to the display mode by the mode determining unit 403, the second panel 407 may form a barrier pattern, for example, a striped pattern, to visualize an image to be displayed on the first panel 405 as a 3D image, as shown in FIG. 5, so that different images may be recognized based on a disparity between left and right views.

In addition, when the display apparatus 401 supports displays of both a two-dimensional (2D) image and a 3D image, the second panel 407 may form the barrier pattern, or may not form the barrier pattern, based on settings set by the control unit 413. For example, when the mode is set to the display mode by the mode determining unit 403, and a 3D image mode is set by the control unit 413, the second panel 407 may form the barrier pattern. Conversely, when the mode is set to the display mode by the mode determining unit 403, and a 2D image mode is set by the control unit 413, the second panel 407 may transfer, to the entire portion of the first panel 405, all of backlights radiated from the backlight unit 411, by enabling all pixels to be transparent, rather than forming the barrier pattern, so that an identical image may be recognized with a left eye and a right eye.

When the mode is set to the photograph mode by the mode determining unit 403, the sensor panel 409 may sense an input light emitted from the object and transmitted through the first panel 405 and the second panel 407. That is, the sensor panel 409 may sense n input lights passing through the n first patterns on the first panel 405, and the n second patterns on the second panel 407.

In particular, the sensor panel 409 may include a sensor unit 409a to sense an input light, and an aperture 409b to transmit a light, in a checkered pattern or in a repetitive pattern. That is, when the mode is set to the photograph mode by the mode determining unit 403, the sensor panel 409 may sense, using the sensor unit 409a, input lights emitted from the object and transmitted sequentially through apertures in the first pattern of the first panel 405 and apertures in the second pattern of the second panel 407, respectively. Conversely, when the mode is set to the display mode by the mode determining unit 403, the sensor panel 409 may transmit, to the second panel 407, the backlight radiated from the backlight unit 411, using the aperture 409b.

Here, although the sensor panel 409 may be configured separately to be disposed on a lower portion of the second panel 407, the configuration of the sensor panel 409 may not be limited thereto. The sensor panel 409 may be configured integrally to be included in the second panel 407. When the sensor panel 409 is configured integrally, the sensor panel 409 may include only the sensor unit 409a.

The backlight unit 411 may be turned ON to radiate a backlight, or may be turned OFF to limit radiation of the backlight, based on the control of the control unit 413. Although the backlight unit 411 may be disposed on a lower portion of the sensor panel 409, the position of the backlight unit 411 may not be limited thereto. The backlight unit 411 may be disposed in the aperture 409b in the sensor panel 409.

The control unit 413 may control power supplied to the backlight unit 411 associated with the second panel 407, based on the mode determined by the mode determined unit 403. For example, when the mode is set to the photograph mode by the mode determining unit 403, the control unit 413 may control the backlight unit 411 to be turned OFF to limit the radiation of the backlight.

Conversely, when the mode is set to the display mode by the mode determining unit 403, the control unit 413 may control the backlight unit 411 to be turned ON to radiate the backlight through the aperture 409b in the sensor panel 409, and the second panel 407 to the first panel 405, such that an image may be displayed on the first panel 405 using the backlight radiated from the backlight unit 411. In this instance, when the mode is set to the display mode by the mode determining unit 403, the control unit 413 may form a barrier pattern on the second panel 407 to visualize the image to be displayed on the first panel 405 as a 3D image.

In addition, when the display apparatus 401 supports displays of both a 2D image and a 3D image, the control unit 413 may set a 2D image mode or a 3D image mode, based on an input command regarding an image mode.

The processor 415 may acquire the image of the object, using the input light sensed by the sensor panel 409. That is, the processor 415 may acquire n partial images of the object, using n input lights sensed by the sensor panel 409, and may configure the entire image of the object based on the n partial images acquired.

Figure 6:
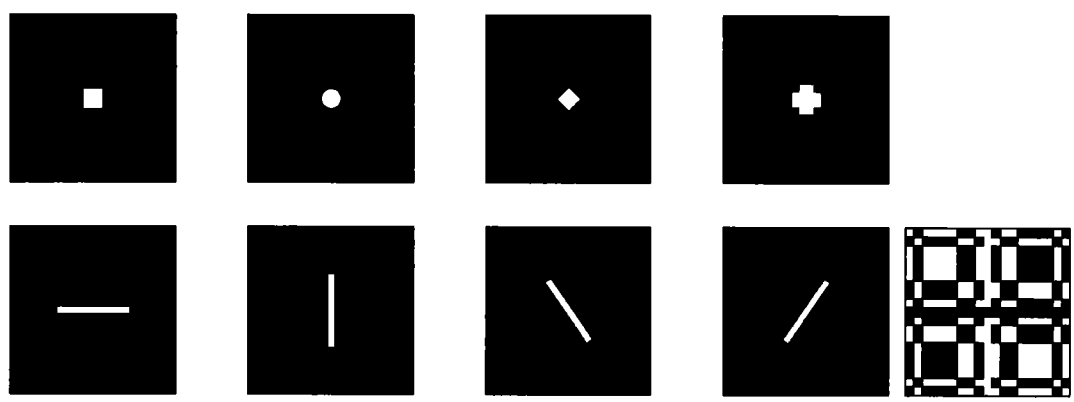
FIG. 6 illustrates examples of a first pattern and a second pattern formed by a display apparatus for controlling a field of view according to an embodiment.

FIG. 6 illustrates examples of a first pattern and a second pattern formed by a display apparatus for controlling a field of view according to an embodiment.

Referring to FIG. 6, a first panel in the display apparatus may form a first pattern, as a field of view control pattern, and a second panel in the display apparatus may form a second pattern, as an imaging pattern.

Here, the first panel may form, for example, at least one pattern of a circular hole pattern, and a polygonal hole pattern, and the second panel may for, for example, at least one pattern of the circular hole pattern, the polygonal hole pattern, and an MURA pattern.

Figure 7:
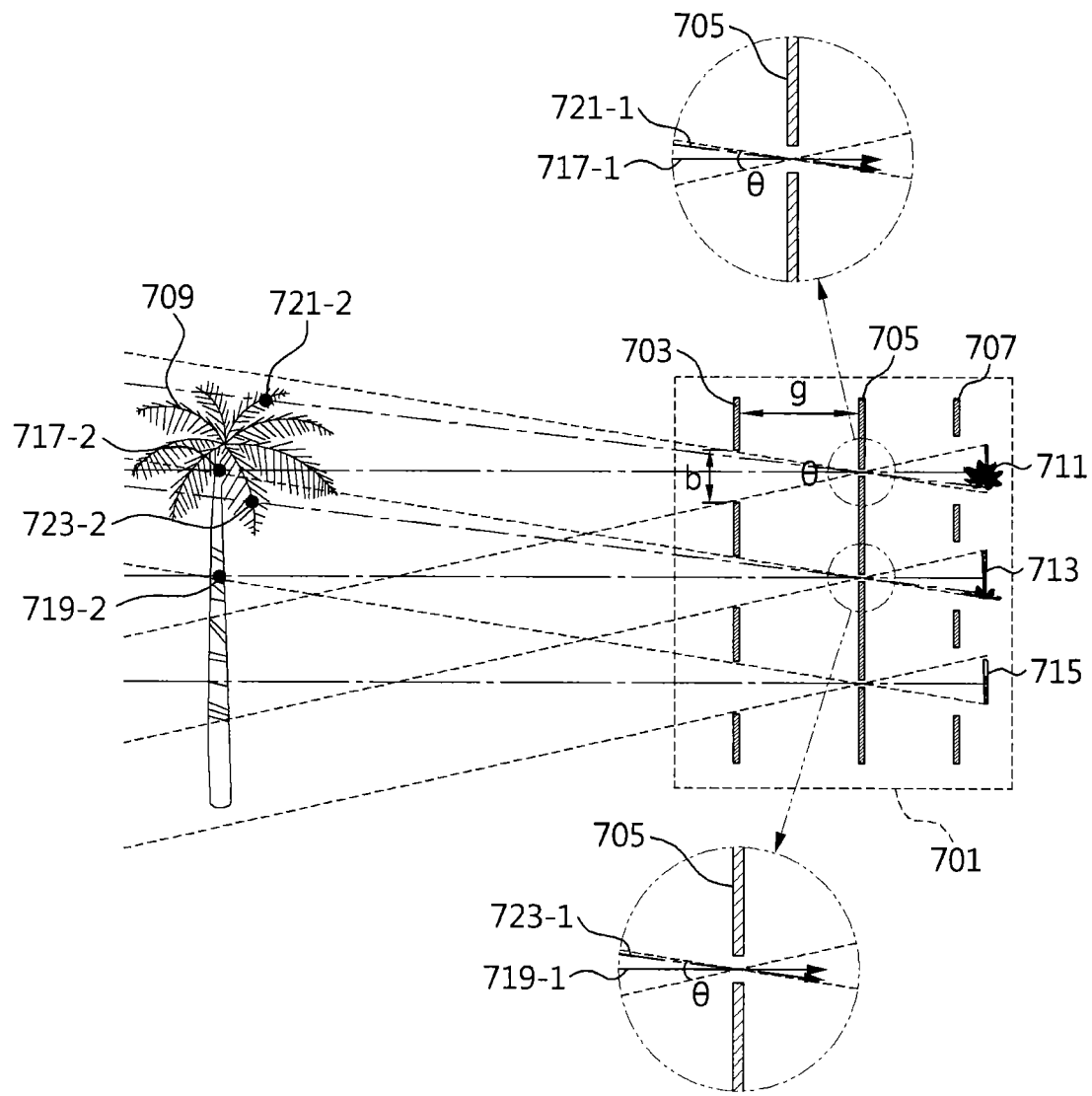
FIG. 7 illustrates an image acquired by a display apparatus for controlling a field of view according to an embodiment.

FIG. 7 illustrates an image acquired by a display apparatus 701 for controlling a field of view according to embodiment.

Referring to FIG. 7, the display apparatus 701 may sense, using a sensor panel 707, an input light emitted from an object 709 and transmitted sequentially through a first panel 703 and a second panel 705. Here, a first pattern, for example, a field of view control pattern, may be formed on the first panel 703, and a second pattern, for example, an imaging pattern, may be formed on the second panel 705. The display apparatus 701 may sense n input lights passing through n first patterns formed on the first panel 703, and n second patterns formed on the second panel 705, respectively, and may acquire an image of the object 709 using the n input lights sensed. Here, n denotes a natural number.

Here, the display apparatus 701 may control a field of view θ, using the first pattern of the first panel 703. The field of view θ may be expressed by Equation 1.

As an example, the display apparatus 701 may acquire a first partial image 711 of the object 709, using a first input light sensed by the sensor panel 707, that is, an input light passing through a first field of view control pattern and a first imaging pattern. The display apparatus 701 may acquire a second partial image 713 of the object 709, using a second input light sensed by the sensor panel 707, that is, an input light passing through a second field of view control pattern and a second imaging pattern. The display apparatus 701 may acquire a third partial image 715 of the object 709, using a third input light sensed by the sensor panel 707, that is, an input light passing through a third field of view control pattern and a third imaging pattern. The display apparatus 701 may configure the entire image of the object 709, by combining the acquired first partial image 711, the acquired second partial image 713, and the acquired third partial image 715.

As another example, the display apparatus 701 may acquire a first point image 717-2 of the object 709 by sensing a first incident light 717-1 passing through the second panel 705 at a right angle, and may acquire a second point image 719-2 of the object 709 by sensing a second incident light 719-1 passing through the second panel 705 at a right angle. The display apparatus 701 may configure a first entire image of the object 709, by combining n point images acquired by sensing n incident lights entering the second panel 705 at right angles. Also, the display apparatus 701 may acquire a third point image 721-2 of the object 709 by sensing a third incident light 721-1 passing through the second panel 705 in a diagonal direction, and may acquire a fourth point image 723-2 of the object 709 by sensing a fourth incident light 723-1 passing through the second panel 705 in a diagonal direction. The display apparatus 701 may configure a second entire image of the object 709, by combining n point images acquired by sensing n incident lights entering the second panel 705 in diagonal directions.

The display apparatus 701 may acquire n partial images, using the n input lights sensed by the sensor panel 707, and may configure p entire images using the n partial images. Here, p denotes a natural number that is less than n. Accordingly, the display apparatus 701 may reduce a distance between second patterns on the second panel 705 that is disposed at a position corresponding to a position of the sensor panel 707, that is, a distance between apertures in the second pattern, thereby forming a relatively great number of patterns on the on the second panel 705, when compared to a conventional display apparatus.

For example, the conventional display apparatus may form 225 imaging patterns, each including 9×9 pixels, in a panel including 135×135 pixels, and may configure 225 entire images corresponding to 225 input lights, using the 225 input lights passing through the 225 imaging patterns formed. However, the display apparatus 701 may form 729 imaging patterns, each including 5×5 pixels, in a second panel including 135×135 pixels, and may configure a plurality of entire images by combining 729 partial images corresponding to 729 input lights acquired using the 729 input lights passing through the 729 imaging patterns formed. Here, the conventional display apparatus may configure the entire image of 9×9 pixels corresponding to a size of the imaging pattern, whereas the display apparatus 701 may configure the entire image of 27×27 pixels, that is, 729 pixels corresponding to a number of the partial images, for example, point images, thereby increasing a spatial resolution of the entire image.

According to an embodiment, a field of view may be controlled during photographing, by disposing, on an upper portion of a second panel on which an imaging pattern is formed, a first panel on which a field of view control pattern is formed, and sensing an input light emitted from an object and transmitted through the first panel and the second panel.

According to an embodiment, a number of imaging patterns on an image panel may increase by adjusting a field of view during photographing, and reducing a distance to be maintained between a plurality of imaging patterns on a second panel, and a spatial resolution of an image may increase by configuring the entire image of an object based on a plurality of partial images acquired using a plurality of input lights passing through the plurality of imaging patterns.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A display apparatus for controlling a field of view, the display apparatus comprising:
    a mode determiner configured to determine a mode based on a photographic or a display set condition; and
    a sensor panel configured to sense at least one input light that is emitted from an object and transmitted through an aperture of a first panel and an aperture of a second panel in a photograph mode set by the mode determiner, wherein:
    the first panel forms a field of view control pattern in response to the mode being set to the photograph mode, the first panel adjusts the size of the aperture in the field of view control pattern, in relation to adjustment of a field of view with respect to the at least one input light to be transferred to the second panel,
    the first panel maintains a predetermined distance from the second panel,
    the first panel adjusts a size of the aperture of the first panel based on a desired field of view, and
    the second panel forms an imaging pattern in response to the mode being set to the photograph mode.

2. The display apparatus of claim 1, wherein:
    positions of n field of view control patterns on the first panel correspond to positions of n imaging patterns on the second panel, respectively, and
    n denotes a natural number.

3. The display apparatus of claim 1, further comprising:
    a processor configured to acquire n partial images of the object using sensed n input lights, and to configure an entire image of the object, based the acquired n partial images, in response to the sensor panel sensing the n input lights passing through the field of view control pattern on the first panel and the imaging pattern on the second panel.

4. The display apparatus of claim 1, wherein:
    the second panel transfers, to the sensor panel through an aperture in the imaging pattern, the at least one input light passing through the adjusted aperture in the field of view control pattern.

5. The display apparatus of claim 1, further comprising:
    a controller configured to control a backlight to be turned ON to radiate a backlight to the second panel, and to control a barrier pattern to be formed on the first panel to visualize an image to be displayed on the second panel as a three-dimensional (3D) image, in response to the mode being set to a display mode by the mode determiner.

6. The display apparatus of claim 1, further comprising:
    a controller configured to control a backlight to be turned ON to radiate a backlight through the second panel to the first panel, and to control a barrier pattern to be formed on the second panel to visualize an image to be displayed on the first panel as a 3D image, in response to the mode is set to a display mode by the mode determiner.

7. The display apparatus of claim 1, wherein:
    each of the first panel and the second panel comprises a first pixel which is opaque and a second pixel which is transparent,
    the first panel forms at least one pattern of a first panel circular hole pattern, and a first panel polygonal hole pattern, by combining the first pixel and the second pixel, and
    the second panel forms at least one pattern of a second panel circular hole pattern, a second panel polygonal hole pattern, and a Modified Uniformly Redundant Array (MURA) pattern, by combining the first pixel and the second pixel.

8. The display apparatus of claim 7, wherein the at least one pattern of the first panel is the same as the at least one pattern of the second panel.

9. The display apparatus of claim 7, wherein the at least one pattern of the first panel is different from the at least one pattern of the second panel.

10. The display apparatus of claim 1, wherein the first panel is a barrier panel.

11. A display apparatus for controlling a field of view, the display apparatus comprising:
a backlight configured to irradiate backlight;
a mode determiner configured to determine a mode based on a photographic or display set condition; and
a sensor panel configured to sense at least one input light that is emitted from an object and transmitted through an aperture of a first panel and an aperture of a second panel in a photograph mode set by the mode determiner, and the sensor panel further configured to transmit backlight irradiated from the backlight to the second panel using at least one aperture in the sensor panel in a display mode set by the mode determiner; wherein:
the first panel forms a field of view control pattern in response to the mode being set to the photograph mode,
the first panel adjusts the size of the aperture in the field of view control pattern, in relation to adjustment of a field of view with respect to the at least one input light to be transferred to the second panel,
the first panel maintains a predetermined distance from the second panel,
the first panel adjusts a size of the aperture of the first panel based on a desired field of view, and
the second panel forms an imaging pattern in response to the mode being set to the photograph mode.

12. The display apparatus of claim 11, further comprising:
a controller configured to control the backlight to be turned ON to radiate the backlight to the second panel, and to control a barrier pattern to be formed on the first panel to visualize an image to be displayed on the second panel as a three-dimensional (3D) image, in response to the mode being set to the display mode by the mode determiner.

13. The display apparatus of claim 11, further comprising:
a controller configured to control the backlight to be turned ON to radiate the backlight through the second panel to the first panel, and to control a barrier pattern to be formed on the second panel to visualize an image to be displayed on the first panel as a 3D image, in response to the mode being set to the display mode by the mode determiner.

14. The display apparatus of claim 11, wherein:
positions of n field of view control patterns on the first panel correspond to positions of n imaging patterns on the second panel, respectively, and
n denotes a natural number.

15. The display apparatus of claim 11, wherein:
each of the first panel and the second panel comprises a first pixel which is opaque and
a second pixel which is transparent,
the first panel forms at least one pattern of a first panel circular hole pattern, and a first panel polygonal hole pattern, by combining the first pixel and the second pixel, and
the second panel forms at least one pattern of a second panel circular hole pattern, a second panel polygonal hole pattern, and a Modified Uniformly Redundant Array (MURA) pattern, by combining the first pixel and the second pixel.

16. The display apparatus of claim 15, wherein the at least one pattern of the first panel is the same as the at least one pattern of the second panel.

17. The display apparatus of claim 15, wherein the at least one pattern of the first panel is different from the at least one pattern of the second panel.

18. The display apparatus of claim 3, wherein each image of the acquired n partial images partially overlaps with another image of the n partial images.

* * * * *